United States Patent [19]
Gersing

[11] 3,824,432
[45] July 16, 1974

[54] BATTERY IGNITER

[75] Inventor: Eberhard Gersing, Gottingen, Germany

[73] Assignee: Braun Aktiengesellschaft, Frankfurt Main, Germany

[22] Filed: Aug. 15, 1973

[21] Appl. No.: 388,655

[30] Foreign Application Priority Data
  Sept. 6, 1973   Germany............................ 2243694

[52] U.S. Cl......................... 317/79, 315/183, 317/96, 431/27, 431/264
[51] Int. Cl.............................................. F23q 3/00
[58] Field of Search............ 317/79, 80, 81, 96, 97; 315/183, 206, 241; 431/27, 70, 264, 266

[56] References Cited
UNITED STATES PATENTS

| | | | |
|---|---|---|---|
| 3,045,148 | 7/1962 | McNulty et al..................... | 315/183 |
| 3,311,789 | 3/1967 | Ramy................................ | 317/96 X |
| 3,383,553 | 5/1968 | Parish et al........................ | 315/183 |
| 3,384,440 | 5/1968 | Mayer................................ | 431/66 |
| 3,584,929 | 6/1971 | Schuette.......................... | 315/206 X |

*Primary Examiner*—Volodymyr Y. Mayewsky
*Attorney, Agent, or Firm*—Ernest F. Marmorek

[57] ABSTRACT

A battery igniter particularly suitable for lighters. The igniter uses a battery as the energy source which in turn feeds a voltage converter including an oscillating transformer with a feedback branch. A rectifier follows the voltage converter to which is connected a storage capacitor. The storage capacitor in turn is connected by means of a high voltage switch to a high voltage igniter transformer. The secondary winding of the high voltage transformer is connected to a spark gap which performs the ignition.

9 Claims, 2 Drawing Figures

BATTERY IGNITER

BACKGROUND OF THE INVENTION

This invention relates generally to transistor circuits and particularly relates to a battery operated igniter specifically suitable for lighters.

Such battery igniters are generally known. It is conventional practice to switch a voltage converter forming part of the igniter in and out by means of an actuation switch. However, the voltage converter remains active as long as the actuation switch is turned on so that the ignition process may be repeated many times even after the fuel of the lighter has already been ignited. This results in a high energy consumption for each ignition so that such a battery igniter is not suitable for pocket lighters.

It is accordingly an object of the present invention to provide a battery igniter of the type discussed which automatically turns itself off after having generated a single ignition spark.

SUMMARY OF THE INVENTION

In accordance with the present invention this is achieved in that the feedback branch by means of a wiper contact operated as the actuation means may be switched into a state which excites the voltage converter to oscillations. Furthermore, the secondary winding of the oscillating transformer of the voltage converter has such a parallel capacity that the energy stored during the secondary peak voltage of the oscillating transformer is larger than the energy required for exciting an oscillation.

The voltage converter consists preferably of a blocking converter or a summing converter. This requires less energy from the battery so that the battery may be made relatively small.

According to a special embodiment of the invention, the wiper contact is used for switching the feedback branch in and out in case a summing converter is used.

In a battery igniter of the type having a voltage converter with a transistor the wiper contact is preferably arranged for switching in and out of the base voltage circuit.

The parallel capacitance may consist of the capacitance of the secondary winding of the oscillating transformer.

The wiper contact may be coupled with an operating contact forming the high voltage switch and which has a delayed action.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawing.

DESCRIPTION OF THE PREFERRED EMBODIMENTS

Figure 1:
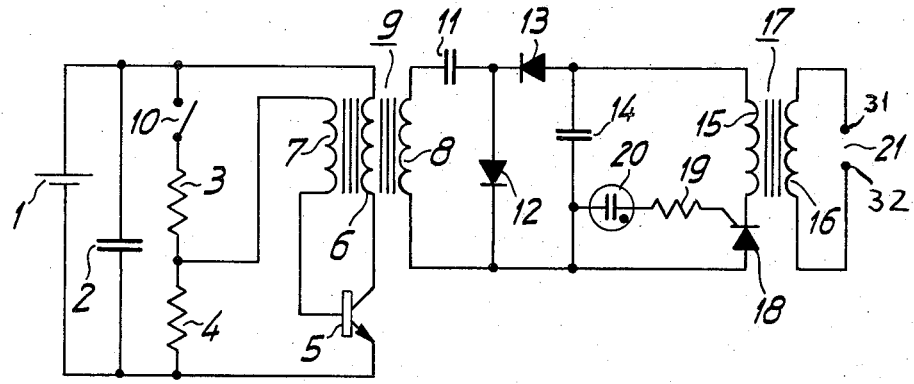
FIG. 1 is a circuit diagram of a battery igniter according to the invention.

The battery igniter of the invention illustrated in FIG. 1 includes a battery 1 having a voltage of 1.5 volts. Connected in parallel to the battery 1 there is provided an electrolytic capacitor 2 which serves the purpose to guarantee the proper operation of the igniter even when the battery has been heavily discharged. The circuit further includes an npn transistor 5, the emitter of which is connected to the negative terminal of the battery 1 and the collector of which is connected by means of the primary winding 6 of an oscillating transformer 9 with the positive terminal of the battery.

The oscillating transformer 9 further includes a feedback winding 7 as well as a secondary winding 8. The feedback winding 7 has one terminal connected to the base of transistor 5 and its other terminal connected to the junction point of a base voltage divider consisting of resistors 3 and 4. One end of the base voltage divider is connected with the chassis and the other end of which is connected to one pole of a wiper contact 10, the other terminal of which is connected to the positive terminal of the battery.

The secondary winding 8 of the oscillating transformer is connected to a Villard rectifier circuit consisting of a charge capacitor 11, two diodes 12 and 13 and a charge storage capacitor 14.

Connected to the charge storage capacitor 14 is the primary winding 15 of a high voltage ignition transformer 17 in series with a thyristor or silicon controlled rectifier 18. The control electrode of the thyristor may be free floating or else it may be connected by means of a series connection of a resistor 19 and a glow lamp 20 or alternatively a high voltage Zener diode with the positive terminal of the charge storage capacitor 14.

The secondary winding 16 of the high voltage ignition transformer 17 is connected with the spark gap 21 defined by electrodes 31, 32 for igniting, for example, the fuel of a lighter.

The circuit operates in the following manner. When the wiper contact 10 is actuated current flows through the voltage divider consisting of resistors 3 and 4 and the feedback winding 7. Accordingly, also a base current flows through transistor 5. As a result, a collector current flows through the primary winding 6 whereby the base voltage is further increased in view of the inductive voltage generated in the feedback winding 7. This process continues until the collector current has reached its maximum value or until the transformer core becomes actuated. Because now the magnetic flux density in the oscillation transformer 9 does no longer increase, there is also no longer an inductive voltage in the feedback winding 7 so that the transistor 5 is blocked when the wiping contact is opened again. As long as the wiping contact is closed, however, the transistor is only blocked when in view of the collapse of the magnetic field in the oscillating transformer there is induced a voltage in the winding 7 which is opposite and larger than the voltage obtained across the resistors 3 and 4 reduced by the emitter-base voltage of the transistor.

In view of the fact that the collector current changes before it reaches its maximum value, a voltage is induced in the secondary winding 8 which charges the charge capacitor 11 via the diode 12.

When the transistor 5 is blocked an inductive voltage is generated in the secondary winding 8 which is of opposite polarity which when added to the voltage across the charge capacitor 11 charges the storage capacitor 14 via the diode 13. However, when no charge current flows to the storage capacitor the diode 13 is blocked and the energy stored in the winding capacity of the secondary winding 8 of the oscillating transformer 9 discharges by means of the oscillating transformer and induces a voltage in the feedback winding 7 which again renders the transistor 5 conductive and thereby initiates a new oscillating cycle.

During the initial oscillations of the voltage converter this energy is not sufficient. Therefore, the wiper contact must be closed for a sufficiently long time.

This cycle repeats until the storage capacitor 14 has been charged to the breakdown voltage of the thyristor 18 or the ignition voltage of the glow lamp or the threshold voltage of the Zener diode. Thereupon the storage capacitor is discharged through the high voltage ignition transformer 17 whereupon a spark is generated across the spark gap 21.

The control electrode of the thyristor 18 may also be connected with a trigger circuit which may consist, for example, of the series combination of a resistor 19 and a glow lamp 20 or else another conventional trigger circuit such, for example, as a Zener diode.

During the discharge of the storage capacitor 14 the winding capacity is practically completely discharged via the diode 12 so that no energy is available for reexciting the oscillation. The voltage converter accordingly rests until the wiper contact 10 is again actuated.

Figure 2:
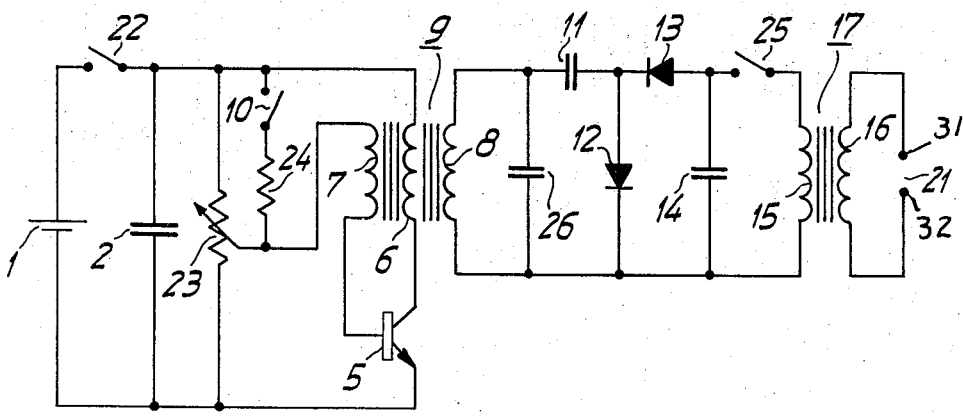
FIG. 2 is a circuit diagram of a modified battery igniter embodying the present invention.

FIG. 2 illustrates an embodiment of the battery igniter of the invention modified with respect to the circuit of FIG. 1. However, the same elements have been designated with the same reference numbers as in FIG. 1.

The circuit differs from that of FIG. 1 in that an additional switch 22 is provided which normally maintains the battery 1 disconnected from the remainder of the circuit.

Furthermore, instead of the voltage divider consisting of fixed resistors there is provided a potentiometer 23 and the wiper contact 10 is connected by means of a resistor 24 to the wiper of the potentiometer 23. By means of the potentiometer the operating point and particularly the behavior of the voltage converter 9 during the initial oscillation may be adjusted.

Finally, instead of the thyristor 18 there is used a switch 25 which is mechanically connected to the wiper contact 10 in such a way that it switches after a predetermined delay after the wiper contact 10 has been actuated. Such delay action switches are well known.

The operation of the circuit of FIG. 2 corresponds to that of FIG. 1. However, care must be taken that the switch 25 is operated with such a time delay that the storage capacitor 14 is already charged to a sufficiently high voltage.

In case the capacity of the secondary winding should be too small, it may be increased by a parallel capacitor 26 shown in dashed lines of FIG. 2 in order to guarantee the proper operation of the circuit.

What is claimed is:

1. Battery igniter of the type provided with a battery as an energy source, a voltage converter consisting of an oscillating transformer fed by the battery and having a feedback branch, a rectifier following the voltage transformer, a charge storage capacitor connected to the rectifier, a high voltage igniting transformer connected to the charge storage capacitor by means of a high current switch, and a spark gap defined by two electrodes connected to the secondary winding of the high voltage transformer, the improvement comprising:

a resistor and a wiper contact operating as an actuation switch for switching the feedback branch into a state capable of exciting the voltage converter into oscillation, the secondary winding of the oscillation transformer of the voltage converter having such a capacity that the energy stored during the secondary peak voltage of the oscillating transformer is at least as large as the energy required for exciting an oscillation.

2. Igniter as defined in claim 1 wherein said voltage converter is a blocking converter.

3. Igniter as defined in claim 1 wherein said voltage converter is a summing converter.

4. Igniter as claimed in claim 3 wherein the rectifier consists of a Villard rectifier.

5. Igniter as defined in claim 1 wherein said wiper contact is connected into the feedback branch for switching said feedback branch into and out of said circuit.

6. Igniter as defined in claim 1 wherein said voltage converter includes a transistor and wherein said wiper contact is coupled to said transistor for switching in and out the base bias voltage thereof.

7. Igniter as defined in claim 1 wherein said parallel capacitance is formed by the capacitance of the secondary winding of said oscillation transformer.

8. Igniter as defined in claim 5 wherein said wiper contact is coupled to an additional operating contact forming the high current switch and having a delayed action.

9. Igniter as defined in claim 1 wherein said wiper consists of an electronic switch.

* * * * *